Feb. 8, 1955   F. N. BARD   2,701,873
WHEEL SLIP INDICATING DEVICE
Filed Sept. 20, 1950   2 Sheets-Sheet 1
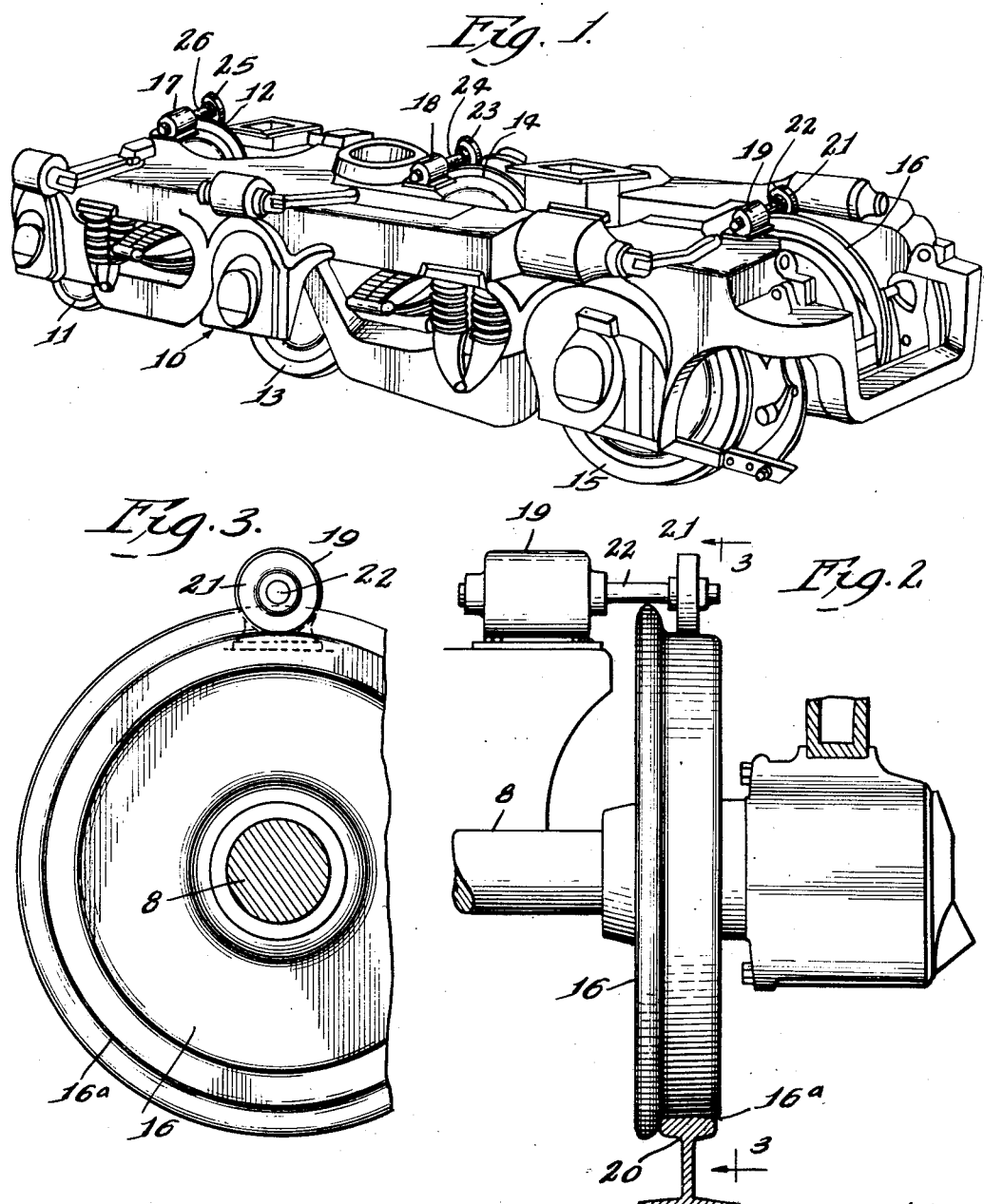
Inventor.
Francis N. Bard.
By Schroeder, Merriam,
Hofgren + Brady.
Attorneys.

Feb. 8, 1955 F. N. BARD 2,701,873
WHEEL SLIP INDICATING DEVICE
Filed Sept. 20, 1950 2 Sheets-Sheet 2

Inventor.
Francis N. Bard.
Schroeder, Merriam,
By. Hofgren & Brady
Attorneys.

United States Patent Office 2,701,873
Patented Feb. 8, 1955

2,701,873

WHEEL SLIP INDICATING DEVICE

Francis N. Bard, Barrington, Ill.

Application September 20, 1950, Serial No. 185,783

6 Claims. (Cl. 340—268)

This invention relates to indicating apparatus, and more particularly to indicating apparatus for detecting deviations in the speed relationship between different wheels as on a locomotive truck.

One feature of the invention is that it provides improved indicating apparatus particularly adapted for detecting deviations in the speed relationship of locomotive wheels; another feature of the invention is that it provides means for developing a plurality of voltages each of which varies as a function of the speed of movement of a different wheel (as the driven and runner wheels of a locomotive truck), and indicating means operated by differences in the voltages to provide an indication of deviations in the speed relationship between said wheels, as for example, to provide an indication that the speed of one of the driven wheels is slower or faster than the speed of the runner wheel, or that a driven wheel has locked; a further feature of the invention is that the indicating means may be polarized and may provide an indication of deviations in the speed relationship between said wheels and also of the direction of speed deviations, as for example, an indication of what will herein be referred to as "spinning slippage"—i. e., that the speed of a driven wheel is greater than the speed of the runner wheel, or of "sliding slippage"—i. e., that the speed of a driven wheel is slower than the speed of the runner wheel; still another feature of the invention is that the voltage developing means are interconnected in voltage-opposing relationship so that the developed voltages are equal and opposed and no current flows when the speed of movement of the driven and runner wheels is the same; yet another feature of the invention is that the respective voltage developing means are driven at a speed proportional to the lineal speed of the peripheral wear surface of the respective driven and runner wheels, the peripheral drive for the voltage developing means automatically compensating for differences in the speed of rotation of said wheels caused by wear at the rail-engaging peripheral portions thereof.

Figure 4:
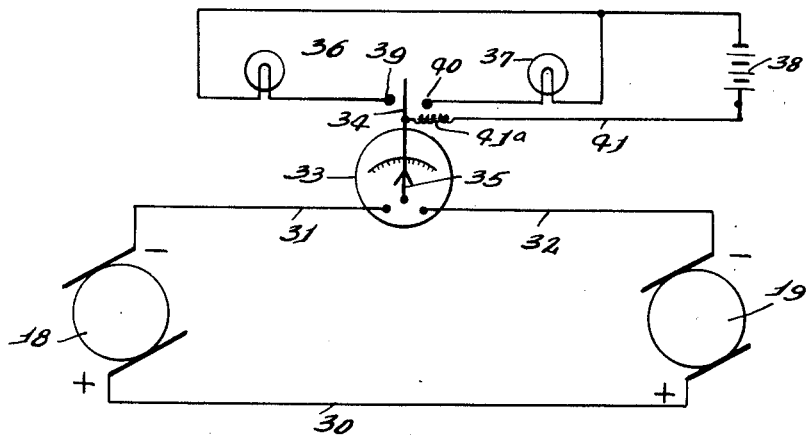
Figure 5:
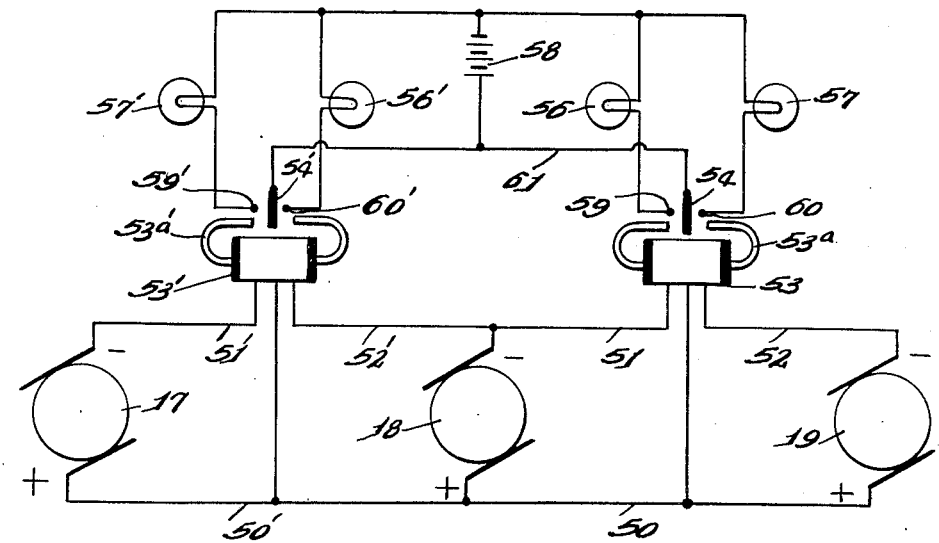

Further features and advantages of the invention will be apparent from the following description and from the drawings, in which:

Fig. 1 is a perspective of a locomotive truck having thereon the voltage developing means which are utilized in the invention; Fig. 2 is an enlarged fragmentary detail view showing one of the wheels and the associated voltage developing means; Fig. 3 is a section along the line 3—3 of Fig. 2, part of the wheel being broken away; Fig. 4 is a basic circuit for the invention; and Fig. 5 is another circuit showing the invention applied to three separate wheels.

A diesel locomotive generally has two trucks each having first and second pairs of driven wheels and a pair of runner wheels. The speed of rotation of the runner wheel is truly indicative of the speed of the locomotive since the runner wheel does not slip. However, the driven wheels may be subject to spinning slippage and run too fast, or to sliding slippage and run too slow; and upon occasion the driven wheels may lock and slide along the tracks. This can be a rather frequent occurrence on diesel locomotives, and can cause wrecks, as well as undesirable wear and flattening of the wheel. The present invention provides novel means for providing an indication of deviations in the speed relationship between the driven wheels and the runner wheel; and one type of indication may be given when the driven wheels deviate only slightly from the speed of the runner wheel, and another type of indication may be given when the driven wheels lock, or spin, and thus in either case deviate greatly in speed. In addition, the apparatus is constructed so that it automatically compensates for wheel wear. While the invention is particularly adapted for use with locomotives, it may be utilized with other types of vehicles and its principles are applicable to other machines having moving parts.

Referring now more particularly to the drawings, a locomotive truck is shown in Fig. 1, its frame or body being designated generally at 10. The truck has a rear pair of driven wheels 11 and 12, a center pair of runner wheels 13 and 14, and a front pair of driven wheels 15 and 16. The driven wheels may be positively turned by motor means, while the runner is an idler and is not positively driven. A generator is mounted on the body 10 adjacent one wheel of each pair, these generators being designated at 17, 18 and 19 in Fig. 1 and cooperating with the respective wheels 12, 14 and 16. Fig. 2 shows one wheel, as the wheel 16, having its rail-engaging peripheral surface 16a riding on a conventional track 20. An axle 8 couples the wheel 16 to its mating wheel 15.

The generator 19 has a follower 21 secured to its drive shaft 22, and as shown in Fig. 1, the generator 18 has a similar follower 23 on its drive shaft 24, and the generator 17 has such a follower on its drive shaft 26. The follower 21 turns the generator 19 at a speed directly proportional to the lineal speed of movement of the periphery of the wheel 16 to develop a voltage generally proportional to the lineal speed of the periphery of the wheel. Should the rail-engaging peripheral surface 16a of the wheel 16 wear so that the circumference of the wheel becomes smaller, the wheel 16 would rotate at a faster rate to maintain a constant lineal speed at its periphery (for a given locomotive speed) so that the peripheral drive arrangement automatically compensates for wheel wear by being proportional to lineal speed. Were the generator 19 driven by the axle or any other part of the wheel other than the actual wear surface thereof, the increased speed of rotation caused by wheel wear would incorrectly increase the speed of operation of the generator 19, thereby giving an indication of wheel wear rather than solely of wheel slippage as is desired.

Because the runner wheel 14 never slips, the speed of operation of the generator 18 (and the voltage developed by said generator) is directly proportional to the speed of the locomotive. However, if either of the driven wheels 16 or 12 is subject to spinning slippage or sliding slippage (which might be caused by dynamic braking of the driven wheels) or if either driven wheel locks, the speed of operation of the respective generators associated with these wheels will be such as to develop voltages which are not directly proportional to the speed of the locomotive, and an indication may be provided of such deviations in the speed relationship between the wheels.

While the generators 17, 18 and 19 illustrated in the drawing are preferably D. C. generators which provide a voltage which varies only in accordance with the speed of movement of the wheels, it will be understood that means for generating an A. C. or alternating voltage is perfectly satisfactory and useable for practising my invention, although if such generating means is used it may be desirable to rectify it before introducing it into the potentiometer circuit or other means for providing the desired indication.

Fig. 4 shows schematically a basic circuit for the indicating apparatus. 18 is the generator associated with the runner wheel and 19 is the generator associated with one of the driven wheels. The generators are connected together at one terminal (the positive terminal as illustrated) by a lead 30, and said generators are interconnected at their other terminals by means of a circuit including leads 31 and 32, this circuit incorporating electro-magnetic actuating apparatus here shown as a sensitive galvanometer current reading type meter 33. A contactor 34 of conductive material may be connected directly to the meter pointer 35. Indicating lamps 36 and 37 each have one terminal connected to one terminal of a battery 38, and the other terminal of the lamps is connected to respective switch contacts 39 and 40. The other terminal of the battery is connected by a lead 41 to the contactor 34, a conventional flexible "pigtail" 41a being provided in this connection.

In Fig. 4, if the driven wheel and the runner wheel move at the same speed the voltage-opposing interconnection between the generators 18 and 19 will create a perfect balance so that no current will flow through the leads 31 and 32 or through the meter 33. This balanced condition will exist even if the driven wheel wears faster than the runner because the driven wheel will then have to rotate faster in order that its periphery (which is then of smaller circumference than that of the runner wheel) maintain the same lineal speed as does the periphery of the runner wheel. The faster speed of rotation together with the smaller circumference of the wheel will provide the same speed of lineal movement at the periphery. Under these balanced conditions the meter pointer is centered as illustrated in Fig. 4, and neither of the lamps 36 or 37 is energized. Should spinning slippage occur in the driven wheel the generator 19 will be operated faster and will develop a higher voltage than is developed by the generator 18, so that current will flow in the circuit including leads 31 and 32 and through the meter, causing deflection of the meter pointer 35. Inasmuch as the meter 33 is a polarized instrument having a zero center position, the pointer 35 will move in one direction if the generator 19 operates faster than does the generator 18 and will move in the other direction if the generator 19 operates slower than does the generator 18 (as in the event sliding slippage occurs in the driver), so that in addition to an indication of the relative amount of deviation in the speed relationship between the wheels, an indication will also be provided of the direction of the speed deviation.

The contactor 34 which is carried by pointer 35 acts, in cooperation with the contactors 39 and 40, as the movable pole of a double-throw switch. In the event the pointer and contactor move in a clockwise direction causing the contactor to engage the contact 40, a circuit will be completed from the battery 38 through the lead 41, contactor 34, contact 40 and lamp 37 back to the battery, so that the lamp will be energized to provide a visual indication of spinning slippage in the driver wheel. Should the driver wheel lock or be subject to sliding slippage so that it moves slower than the runner wheel, current through the meter will cause the pointer to move in the other direction, thus completing a circuit through the contact 39 to energize the lamp 36. If desired the indicating means may provide a different type of indication. For example, a pen type recorder might be operated to provide a permanent record of deviations in the speed relationship of the wheels.

Fig. 5 shows an arrangement in which both drivers and the runner are interconnected in voltage-opposing relationship. In Fig. 5 similar parts will be designated by reference characters 20 higher than those used in Fig. 4.

The generators 17, 18 and 19 are shown schematically, the generator 17 being operated by the driver 12 of Fig. 1, the generator 18 being operated by the runner 14, and the generator 19 being operated by the driver 16. Like terminals of the generators 17, 18 and 19 are interconnected by a lead 50 and the other terminals of the generators 18 and 19 are interconnected by a circuit including leads 51 and 52, this circuit incorporating a polarized relay 53 having associated therewith a magnet 53a and a movable armature 54 adapted to move between a neutral position, as illustrated, into engagement with either one of contacts 59 and 60. Indicating lamps 56 and 57 each have one terminal connected to one of the respective contacts 59 and 60 and the other terminal connected to one terminal of a battery 58, the other terminal of which is connected by a lead 61 to the armature 54.

The generators 17 and 18 are interconnected in like manner, a lead 50' interconnecting the positive terminals and a circuit including leads 51' and 52' interconnecting the negative terminals and incorporating electromagnetic means comprising a polarized relay 53' having a magnet 53a' and a movable armature 54' for engagement with respective stationary contacts 59' and 60'. Lamps 56' and 57' are connected between the battery 58 and the respective contacts 59' and 60'.

The operation is similar to that of Fig. 4, except that the polarized relay itself acts purely as an actuating means and does not include a pointer or other indicating means. When the voltage developed by each generator is equal, no current flows in the circuits including the actuating means and the relay armatures are centered. In the event spinning slippage occurs in the wheel 16 so that the generator 19 speeds up, current through the relay 53 will cause the armature 54 to move into engagement with one of the contacts (as the contact 60) to complete a circuit to energize the lamp 57, this circuit extending from the battery through the lead 61, armature 64, contact 60 and lamp 57 back to the battery. Should wheel 16 lock or be subject to sliding slippage the direction of current flow would be reversed and the armature 54 would move into engagement with contact 59 to energize lamp 56, so that the arrangement of Fig. 5 provides an indication of deviations in the speed relationship between the wheels and also provides indications of the direction of speed deviations.

The connections between the generators 17 and 18 and the actuating and indicating apparatus are similar to those above described for generators 18 and 19, and the operation is similar to show deviations in the speed relationship between the other driven wheel and the runner, and the direction of such deviations.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a locomotive having a driven wheel and a runner wheel, indicating apparatus of the character described, comprising: first means for developing a voltage which varies as a function of the speed of movement of the driven wheel; second means for developing a voltage which varies as a function of the speed of movement of the runner wheel; and indicating means adapted to be operated by differences in the voltages developed to provide an indication of deviations in the speed relationship between said wheels.

2. In a locomotive having a driven wheel and a runner wheel, indicating apparatus of the character described, comprising: first means for developing a voltage which varies as a function of the speed of movement of the driven wheel; second means for developing a voltage which varies as a function of the speed of movement of the runner wheel; and polarized indicating means adapted to be operated by differences in the voltages developed to provide an indication of deviations in the speed relationship between said wheels and of the direction of speed deviations.

3. In a machine having a driven wheel and a runner wheel, indicating apparatus of the character described, comprising: first means for developing a voltage which varies as a function of the speed of movement of the driven wheel; second means for developing a voltage which varies as a function of the speed of movement of the runner wheel, said voltages being equal when the speed of movement of the wheels is the same; a circuit interconnecting said first and second voltage developing means in voltage-opposing relationship, there being no current flow in said circuit when the speed of movement of the wheels is the same; and indicating means adapted to be operated by current flowing in said circuit when the speed of movement of one wheel is different from the speed of movement of the other wheel to provide an indication of deviations in the speed relationship between said wheels.

4. In a locomotive having a driven wheel and a runner wheel each with a rail-engaging peripheral portion, indicating apparatus of the character described, comprising: first means for developing a voltage which varies as a function of the lineal speed of movement of the periphery of the driven wheel, this means being driven from the rail-engaging peripheral portion of said driven wheel; second means for developing a voltage which varies as a function of the lineal speed of movement of the periphery of the runner wheel, said second means being driven from the rail-engaging peripheral portion of said runner wheel; and indicating means adapted to be operated by differences in the voltages developed to provide an indication of deviations in the speed relationship between said wheels, the peripheral drive for said voltage developing means compensating for differences in the speed of rotation of said wheels caused by wear at the rail-engaging peripheral portions thereof.

5. In a vehicle having a driven wheel and a runner wheel, indicating apparatus of the character described, comprising: a first generator adapted to be driven by the rail-engaging peripheral surface of the driven wheel to develop a voltage which varies as a function of the lineal speed of movement of the periphery of said driven wheel; a second generator adapted to be driven by the rail-engaging peripheral surface of the runner wheel to develop a voltage which varies as a function of the lineal speed of movement of the periphery of said runner wheel, said voltages being equal when the lineal speed of movement of the wheels at the periphery thereof is the same; a circuit interconnecting said first and second generators in voltage-opposing relationship, there being no current flow in said circuit when the speed of movement of the wheels is the same; actuating means in said circuit operated by current flowing in said circuit when the speed of movement of one wheel is different from the speed of movement of the other wheel; and indicating means operated by said actuating means to provide an indication of deviations in the speed relationship between said wheels.

6. In a locomotive having a truck with a driven wheel and a runner wheel, indicating apparatus of the character described, comprising: a first generator adapted to be driven by the rail-engaging peripheral surface of the driven wheel to develop a voltage which varies as a function of the lineal speed of movement of the periphery of said driven wheel; a second generator adapted to be driven by the rail-engaging peripheral surface of the runner to develop a voltage which varies as a function of the lineal speed of movement of the periphery of said runner wheel; a circuit connecting said generators together in voltage-opposing relationship, there being no current flow in said circuit when the lineal speed of movement at the periphery of the wheels is the same; polarized actuating means in said circuit operated by current flowing in said circuit when the speed of movement of one wheel is different from the speed of movement of the other wheel; a normally open double-throw switch having its movable pole operated by said actuating means; a first indicator connected to one contact of said switch; a second indicator connected to the other contact of said switch; and energizing means connected to each of said indicators and to said movable pole, operation of said actuating means closing said switch to actuate at one or the other of said indicators to provide an indication of deviations in the speed relationship between said wheels and of the direction of speed deviations.

References Cited in the file of this patent

UNITED STATES PATENTS

| Number | Name | Date |
|---|---|---|
| 381,915 | Dey | May 1, 1888 |
| 923,511 | Greenbaum | June 1, 1909 |
| 1,686,638 | Pierce | Oct. 9, 1928 |
| 2,051,018 | Umansky | Aug. 11, 1936 |
| 2,208,738 | Hines | July 23, 1940 |
| 2,257,310 | Sorensen | Sept. 30, 1941 |
| 2,286,680 | Hines | June 16, 1942 |
| 2,328,994 | Ogden | Sept. 7, 1943 |
| 2,332,584 | McCune | Oct. 26, 1943 |
| 2,335,984 | Wilson | Dec. 7, 1943 |
| 2,372,145 | Weybrew | Mar. 20, 1945 |
| 2,387,901 | Haverstick | Oct. 30, 1945 |
| 2,418,587 | Laid | Apr. 8, 1947 |
| 2,447,208 | Rendel | Aug. 17, 1948 |
| 2,447,713 | Newell | Aug. 24, 1948 |
| 2,484,374 | Cahen et al. | Oct. 11, 1949 |
| 2,592,342 | Ryckman | Apr. 8, 1952 |

OTHER REFERENCES

Railway-Age for September 9, 1950, pp. 47 to 50.